Patented May 1, 1951

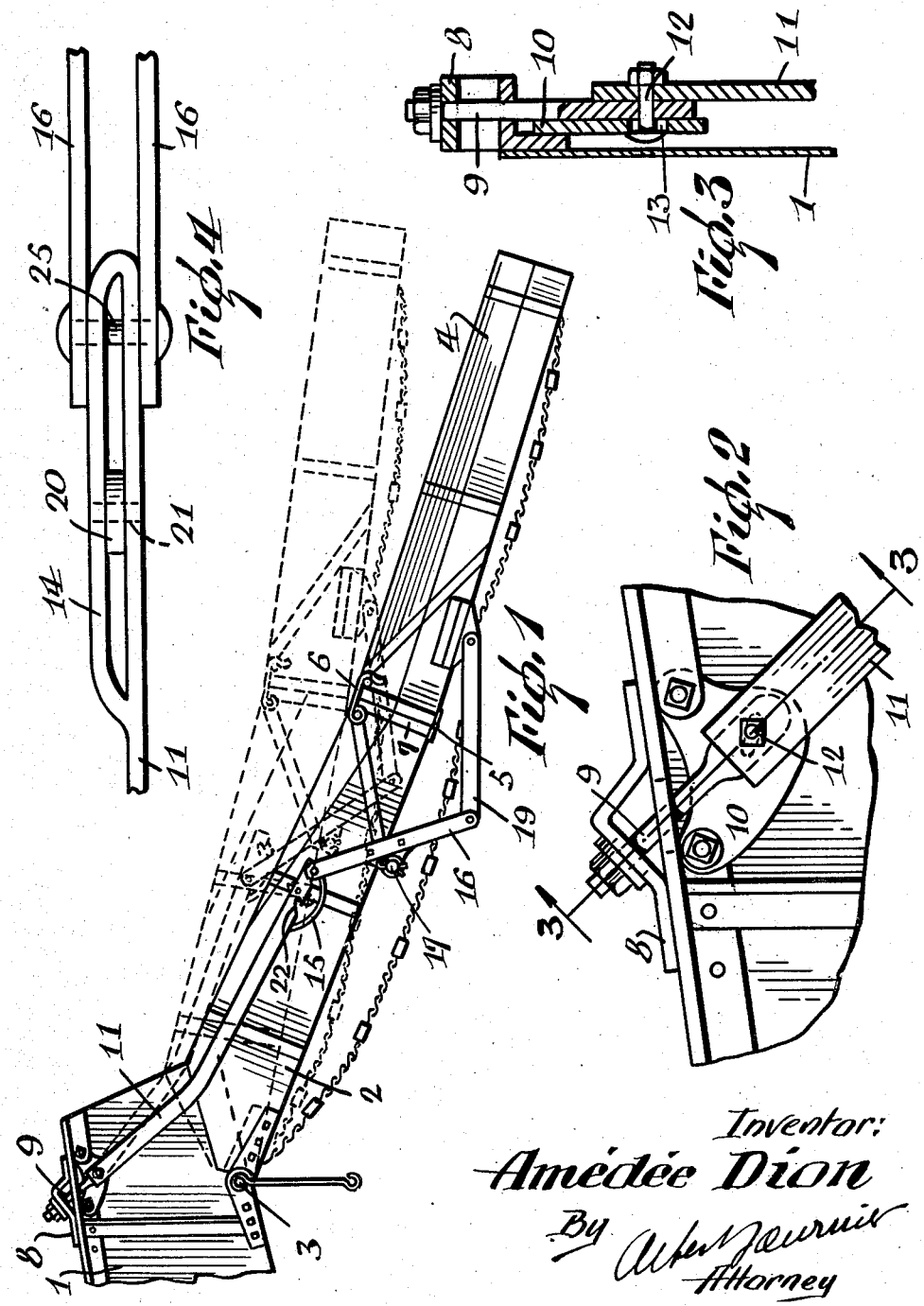

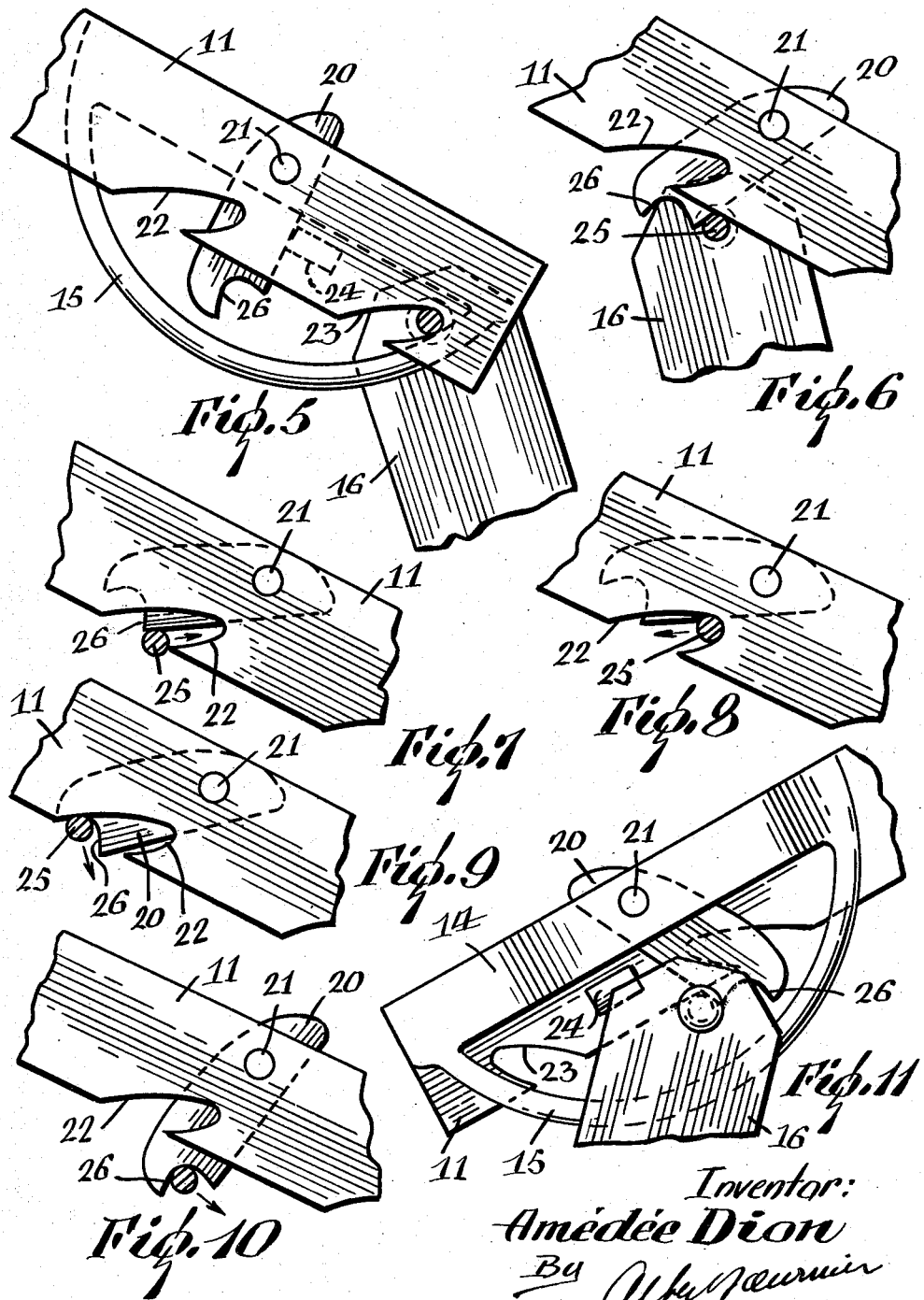

2,550,978

UNITED STATES PATENT OFFICE 2,550,978

ADJUSTABLE FEEDER APRON FOR AGRICULTURAL MACHINES

Amedee Dion, Ste-Therese de Blainville, Quebec, Canada, assignor to Dion Freres Inc., Ste-Therese de Blainville, Quebec, Canada Application December 22, 1949, Serial No. 134,426

4 Claims. (Cl. 198—115)

The present invention pertains to a novel adjustment for feeder aprons for threshers and similar machines. The feeder apron slopes downward from the body of the machine, and it is often desirable to change the angle of the slope.

The principal object of the invention is to provide a construction whereby this adjustment is easily accomplished by hand. Another object is to provide a relatively simple, rugged and inexpensive construction for the purpose set forth.

In the accomplishment of these objects, the upper end of the feeder apron is pivoted to the body of the machine, and a pair of arms extend from the body alongside the feeder apron at both sides. Each arm has a pair of notches in its lower edge, while the feeder apron carries a braced lever at each side with a pin at its free end. The pin is selectively receivable in the notches, and the angular position of the feeder apron is determined by the notches in which the pin is received.

The invention further includes an arcuate guide for the pin along the notched end of each arm to prevent the levers from dropping. Further, a pivoted dog is provided at one of the notches of each arm to prevent the pins from re-entering said notches on being transferred therefrom to the other notches.

The invention is fully disclosed by way of example in the following description and in the accompanying drawings in which:

Figure 1 is an elevation of a feeder apron according to the invention;

Figure 2 is a detail thereof;

Figure 3 is a section on the line 3—3 of Figure 2;

Figure 4 is a detail plan view;

Figures 5 to 10 are detail elevations showing different positions of parts, and

Figure 11 is a similar elevation showing the assembly on the opposite side of the chute.

Reference to these views will now be made by use of like characters which are employed to designate corresponding parts throughout.

In Figure 1 is shown a body portion 1 of a threshing machine. This portion is fixed on the wheeled machine and receives the grain bundles to be fed to the upper and lower feed pans of the machine.

An upper feeder apron section 2 slopes downward from the member 1, and is hinged to this member at 3. To the lower end of the section 2 is attached a lower chute section 4 by means of a bottom hinge 5. A hook 6 covers the upper ends of the hinge leaves 7 to hold them from separating.

On each upper edge of the member 1 is secured a bracket 8 in which is mounted a stem 9. The construction associated therewith is provided on each side of the chute, and therefore it will be necessary to describe only the construction at one side. A reinforcing plate 10 is secured to the member 1 adjacent to the stem 9. To the lower end of the latter is attached an arm 11 by a bolt 12 which passes through a slot 13 in the plate 10, the slot permitting some play of the bolt, as will presently appear.

The lower end of the arm 11 is doubled at 14 (Fig. 4), and from this end is suspended an arcuate guide member 15. A first class double lever 16 is fulcrumed on the section 2 at 17, with its upper end straddling the doubled end of the arm 11. The lower end of the lever 16 is joined to the bottom of the lower chute section 4 by a link 19.

In the doubled portion of the arm 11 is pivotally mounted a dog 20 within the guide 15, on a pin 21. The lower edge of the arm 11 is notched at 22 and 23 within the guide, the notches sloping from their open ends away from the body 1. A stop 24 carried by the arm 11 is engageable by the downward side of the dog and limits its movement in that direction. The upper end of lever 16 carries a pin 25 receivable selectively in the notches.

Figure 1 shows the chute in a lower position in full lines and in an upper position in dotted lines. Figure 5 corresponds to the lower position. The lower end of the lower feeder apron section is off the ground or other support, and the feeder is supported in this position by the swivel shaft 3 and the arm 11. The lever 16 is hooked in the notch 23 by the pin 25 and braces the lower feeder apron section 4 through the link 19.

To adjust the feeder to the upper dotted line position, the lower end of member 4 is raised slightly. The pin 25 departs from the notch 23, as in Figure 6, riding along the lower edge of the arm 11 and moving the dog 20. The pin finally enters and seats in the notch 22, as in Figures 7 and 8. The lift on the lower end of the member 4 may now be released, and the upper position is maintained by the seating of the pin 25 in the notch 22.

To bring the feeder apron to the lower position, the lower end of the feeder apron is again lifted slightly to remove the pin 25 from the notch 22. As the pin leaves the notch, the dog 20 drops and its concave lower end 26 engages the pin, as in Figure 9, to prevent its re-entry into the same notch. On further lifting of the feeder apron section 4, the pin rides with the dog, as in Figure 10, until it reaches and enters the notch 23, to resume the position shown in Figure 5.

In another adjustment, not shown, the hook 6 is released from the hinge leaves 7 and the lower section 4 swung under the feeder apron section 2 for travel.

Although a specific embodiment of the invention has been illustrated and described, it will be understood that various alterations in the details of construction may be made without departing from the scope of the invention as indicated by the appended claims.

What I claim is:

1. In an agricultural machine, a body, a feeder apron hinged thereto, a chute section hinged to said apron, an arm extending from said body along said feeder apron and having two notches along its lower edge, a first class lever fulcrumed on said feeder apron, a pin carried by one end of said lever and receivable selectively in said notches, said arm being doubled at said notches, a dog pivotally mounted in said double portion and adapted to cover one of said notches, and a link connecting the other end of said lever to said chute section.

2. In an agricultural machine, a body, a feeder apron hinged thereto, a chute section hinged to said apron, an arm extending from said body along said feeder apron and having two notches along its lower edge, a first class lever fulcrumed on said feeder apron, a pin carried by one end of said lever and receivable selectively in said notches, said arm being doubled at said notches, a dog pivotally mounted in said doubled portion and adapted to cover one of said notches, the lower end of said dog being concave for engagement by said pin, and a link connecting the other end of said lever to said chute section.

3. In an agricultural machine, a body, a feeder apron hinged thereto, a chute section hinged to said apron, an arm extending from said body along said feeder apron and having two notches along its lower edge, a first class lever fulcrumed on said feeder apron, a pin carried by one end of said lever and receivable selectively in said notches, said arm being doubled at said notches, a dog pivotally mounted in said doubled portion and adapted to cover one of said notches, an arcuate guide for said pin beneath said notches, and a link connecting the other end of said lever to said chute section.

4. In an agricultural machine, a body, a feeder apron hinged thereto, a chute section hinged to said apron, an arm extending from said body along said feeder apron and having two notches along its lower edge, a first class lever fulcrumed on said feeder apron, a pin carried by one end of said lever and receivable selectively in said notches, said arm being doubled at said notches, a dog pivotally mounted in said doubled portion and adapted to cover one of said notches, the lower end of said dog being concave for engagement by said pin, an arcuate guide for said pin beneath said notches, and a link connecting the other end of said lever to said chute section.

AMEDEE DION.

REFERENCES CITED

The following references are of record in the file of this patent:

UNITED STATES PATENTS

| Number | Name | Date |
|---|---|---|
| 274,540 | Williamson | Mar. 27, 1883 |
| 634,212 | Grawitz | Oct. 3, 1899 |
| 1,111,685 | Allison | Sept. 22, 1914 |
| 1,140,852 | Roeder | May 25, 1915 |
| 1,275,067 | Mertz | Aug. 6, 1918 |
| 1,299,365 | McIntyre | Apr. 1, 1919 |
| 2,224,825 | Krakauer | Dec. 10, 1940 |